H. W. RUMFELT.
Combined Plows, Scrapers, and Choppers.

No. 146,404.　　　　　　　　　　Patented Jan. 13, 1874.

WITNESSES:
E. Wolff.
C. Sedgwick

INVENTOR:
H. W. Rumfelt
BY
ATTORNEYS.

UNITED STATES PATENT OFFICE.

HEZEKIAH W. RUMFELT, OF SOUTH POINT, NORTH CAROLINA.

IMPROVEMENT IN COMBINED PLOWS, SCRAPERS, AND CHOPPERS.

Specification forming part of Letters Patent No. 146,404, dated January 13, 1874; application filed November 22, 1873.

*To all whom it may concern:*

Figure 1:
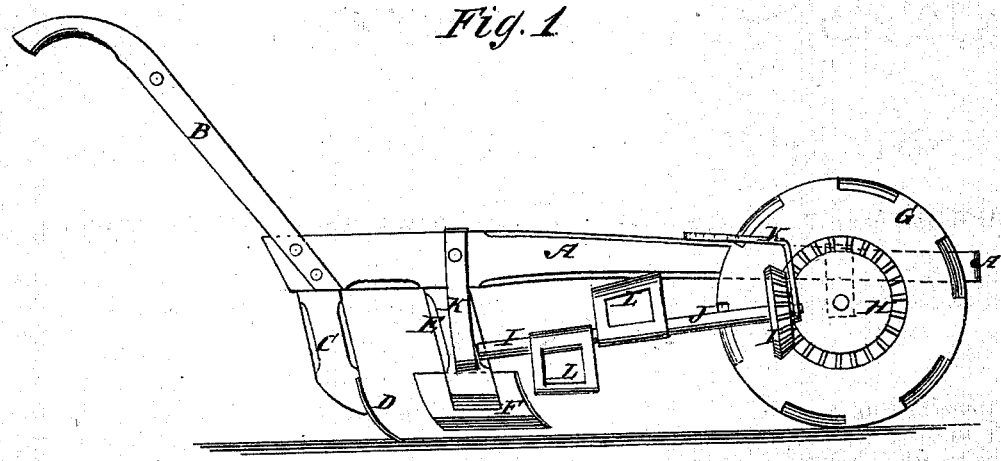
Figure 2:
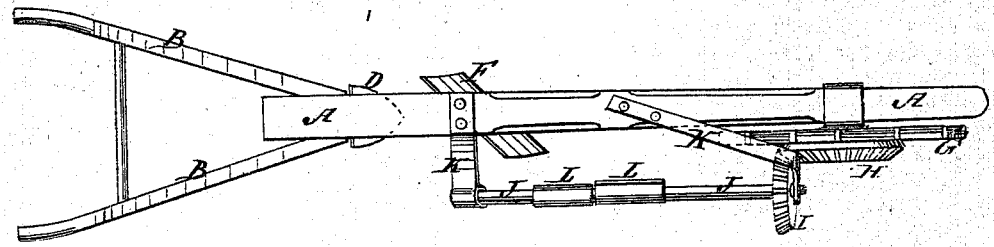

Be it known that I, HEZEKIAH W. RUMFELT, of South Point, in the county of Gaston and State of North Carolina, have invented a new and useful Improvement in Combined Plow, Scraper, and Chopper, of which the following is a specification:

Figure 1 is a side view of my improved machine. Fig. 2 is a top view of the same.

Similar letters of reference indicate corresponding parts.

The invention will first be fully described, and then pointed out in the claim.

A represents a plow-beam, to the rear end of which the handles B are attached, in the ordinary manner. To the rear end of the beam A is attached a standard, C, to the lower end of which is attached a shovel or other suitable plow, D, for throwing soil around the plants. To the beam A, a little in front of the standard C, is attached a second standard, E, to the lower end of which is attached a scraper, F, for barring off the plants. G is a wheel, which revolves in a support attached to the forward part of the beam A, and to the side of which is attached, or upon it is formed, a bevel-gear wheel, H, into the teeth of which mesh the teeth of a small bevel-gear wheel, I, attached to the forward end of the shaft J. The shaft J revolves in bearings in arms K, attached to the beam A. To the shaft J are attached two knives, L, the shanks or holders of which are made of such a length that the knives may be in proper position to chop the plants.

The chopper should be provided with a device (not shown in the drawings) for throwing it out of gear, for convenience in turning and in passing from place to place.

Having thus described my invention, I claim as new and desire to secure by Letters Patent—

The combination of the chopper L L, the following scraper F, and the rear plow D, as and for the purpose described.

HEZEKIAH W. RUMFELT.

Witnesses:
J. E. NEAGLE,
C. C. WITHERS.